(12) United States Patent
Newbury et al.

(10) Patent No.: US 11,544,755 B2
(45) Date of Patent: Jan. 3, 2023

(54) METHOD AND APPARATUS FOR THE PRODUCTION OF GARMENTS

(71) Applicant: GERBER TECHNOLOGY LLC, Tolland, CT (US)

(72) Inventors: Karsten H. Newbury, Frisco, TX (US); Elizabeth King, Tolland, CT (US); Nicholas Jouriles, Tolland, CT (US); Thomas Andrew Gordon, Glastonbury, CT (US)

(73) Assignee: GERBER TECHNOLOGY LLC, Tolland, CT (US)

( * ) Notice: Subject to any disclaimer, the term of this patent is extended or adjusted under 35 U.S.C. 154(b) by 568 days.

(21) Appl. No.: 16/560,010

(22) Filed: Sep. 4, 2019

(65) Prior Publication Data

US 2020/0074521 A1     Mar. 5, 2020

Related U.S. Application Data (60) Provisional application No. 62/816,804, filed on Mar. 11, 2019, provisional application No. 62/734,666, (Continued)

(51) Int. Cl.
*G06Q 30/06* (2012.01)
*G06F 16/23* (2019.01)
(Continued)

(52) U.S. Cl.
CPC ..... *G06Q 30/0621* (2013.01); *G06F 16/2379* (2019.01); *B26D 5/20* (2013.01);
(Continued)

(58) Field of Classification Search
CPC . G06Q 30/0621; G06F 16/2379; G06N 20/00
(Continued)

(56) References Cited

U.S. PATENT DOCUMENTS

| | | |
|---|---|---|
| 5,544,599 A | 8/1996 | Frazer et al. |
| 7,260,445 B2 | 8/2007 | Weiser et al. |

(Continued)

FOREIGN PATENT DOCUMENTS

| | | | | |
|---|---|---|---|---|
| CA | 2752888 A1 * | 2/2011 | ....... | G06Q 10/06393 |
| CN | 104120602 B | 8/2016 | | |

(Continued)

OTHER PUBLICATIONS

Dolbow, Sandra, "DuPont employs new tag, technology to protect Lycra's brand integrity", published Dec. 9, 2002 in Brandweek43. 45: 4. Adweek LLC; retrieved from Dialog database on May 3, 2022.*

(Continued)

*Primary Examiner* — Yogesh C Garg
(74) *Attorney, Agent, or Firm* — Day Pitney LLP; George N. Chaclas (57) ABSTRACT

A garment production system, comprising a virtual development environment configured to receive and store in a database thereof body information relating to a user, establish measurements for the user based on the body information, display, on a display device connected to the virtual development environment, a virtual representation of the user using the established measurements, customize one or more garments for the user based on the established measurements, display, on the display device, a virtual representation of the one or more customized garments on the virtual representation of the user, receive and store in the database personalization information from the user regarding the one or more customized garments, and alter the one or more customized garments and the virtual representation thereof based on the received personalization information for manufacture thereof.

20 Claims, 5 Drawing Sheets

Related U.S. Application Data filed on Sep. 21, 2018, provisional application No. 62/734,711, filed on Sep. 21, 2018, provisional application No. 62/727,400, filed on Sep. 5, 2018.

(51) Int. Cl.
| | |
|---|---|
| G06N 20/00 | (2019.01) |
| B65H 23/188 | (2006.01) |
| B26D 5/20 | (2006.01) |
| D06P 5/30 | (2006.01) |
| B65H 20/02 | (2006.01) |
| D06P 1/92 | (2006.01) |
| B65H 20/30 | (2006.01) |
| D06H 1/02 | (2006.01) |
| D06H 7/00 | (2006.01) |

(52) U.S. Cl.
CPC .............. *B65H 20/02* (2013.01); *B65H 20/30* (2013.01); *B65H 23/1888* (2013.01); *D06H 1/02* (2013.01); *D06H 7/00* (2013.01); *D06P 1/922* (2013.01); *D06P 5/30* (2013.01); *G06N 20/00* (2019.01)

(58) Field of Classification Search
USPC ....................................................... 705/26.5
See application file for complete search history.

(56) References Cited

U.S. PATENT DOCUMENTS

| | | | |
|---|---|---|---|
| 8,731,703 B1 | 5/2014 | Lehrer et al. | |
| 2003/0093330 A1* | 5/2003 | Pabst ................. | G06Q 30/0641 |
| | | | 705/26.8 |
| 2014/0176565 A1* | 6/2014 | Adeyoola ........... | G06F 16/5854 |
| | | | 345/473 |
| 2015/0134495 A1* | 5/2015 | Naware .................. | G06T 17/00 |
| | | | 705/27.2 |
| 2016/0210602 A1* | 7/2016 | Siddique .............. | G06Q 20/321 |
| 2018/0012385 A1* | 1/2018 | Choi ....................... | A41H 3/007 |
| 2019/0287150 A1* | 9/2019 | Anger ................ | G06Q 30/0621 |

FOREIGN PATENT DOCUMENTS

| | | | | |
|---|---|---|---|---|
| CN | 107527156 A | * | 12/2017 | ......... G06Q 30/0643 |
| EP | 0754641 A1 | | 1/1997 | |
| KR | 20160133893 A | * | 11/2001 | ......... G06Q 30/0621 |
| WO | 1998/013177 A1 | | 4/1998 | |
| WO | 2017/122088 A1 | | 1/2017 | |
| WO | 2017/213539 A1 | | 12/2017 | |
| WO | 2018/023643 A1 | | 2/2018 | |

OTHER PUBLICATIONS

Mercer, Neil, "Blitz on armed hold-ups", [2 First Edition] published Aug. 29, 2004 in Sunday Telegraph [Surry Hills, N.S.W] Aug. 29, 2004: 38, retrieved from Dialog database on May 3, 2022.*

The International Search Report and the Written Opinion of the International Searching Authority issued in related international application No. PCT/US2019/049477, dated Dec. 13, 2019.

The International Search Report and the Written Opinion of the International Searching Authority issued in corresponding international application No. PCT/US2019/049463, dated Nov. 20, 2019.

International Search Report and Written Opinion of the International Searching Authority issued in related international application No. PCT/US2019/049477, dated Jan. 17, 2020.

\* cited by examiner

METHOD AND APPARATUS FOR THE PRODUCTION OF GARMENTS

RELATED APPLICATIONS

This application claims priority to U.S. Application Ser. No. 62/727,400, filed Sep. 5, 2018, 62/734,666, filed Sep. 21, 2018, 62/734,711, filed Sep. 21, 2018, and 62/816,804, filed Mar. 11, 2019. The disclosures and teachings of each of the foregoing references are incorporated by reference herein.

BACKGROUND OF THE INVENTION

Field of the Invention

The invention relates to systems and methods for the automated production of garments. More specifically, the invention relates to systems and methods for the fully- or partly-automated production of garments managed by digital work flow.

Description of the Related Art

Garment manufacturing involves many processing steps, beginning with an idea or design concept and ending with a finished product. The garment manufacturing process involves product design, customization/alteration and fit, pattern making, fabric selection, marker marking, spreading, cutting, sewing, ironing, quality control.

Garment factories receive fabric from textile manufacturers in large bolts. Many garment manufacturers perform quality assurance upon receipt of the fabric to ensure that the quality of the fabric meets customer standards. This step is performed by manually spot-checking each bolt of fabric using a backlit surface to identify textile defects such as color inconsistency or flaws in the material. Fabrics that fail to meet customer standards are returned to the textile manufacturer.

After the fabric has been accepted, it is transferred to the spreading and cutting area of the garment manufacturing facility. The fabric is spread either manually or using a computer-controlled system in preparation for the cutting process. The fabric is spread to: allow operators to identify fabric defects; release the tension and stress in the fabric; and ensure each ply is accurately aligned on top of the others in preparation for multiply cutting.

The number of plies in each spread is dependent on the fabric type and cutting equipment, and size of the garment order.

Next, pre-printed garment patterns or markers are laid out on top of the spread for manual cutting or programmed into a control computer for automated cutting. Lastly, the fabric is cut to the shape of the garment patterns using either manually operated cutting equipment or a computerized cutting system.

Screen printing occurs when specified by the customer. Screen printing may be requested to put logos or other graphics on garments or to print brand and size information in place of affixing tags. This process may have varying levels of automation or may largely be completed at manually operated stations. Screen printing can be done on cut pieces or completed garments.

Garments are then sewn in an assembly line, with the garment becoming complete as it progresses down the sewing line. Sewing machine operators receive a bundle of cut fabric and repeatedly sew the same portion of the garment, passing that completed portion to the next operator. For example, the first operator may sew the collar to the body of the garment and the next operator may sew a sleeve to the body. Quality assurance is performed at the end of the sewing line to ensure that the garment has been properly assembled and that no manufacturing defects exist. When needed, the garment will be reworked or mended at designated sewing stations. This labor-intensive process progressively transforms pieces of fabric into finished garments. Care, content and country of origin labels must be sewn into the garment during construction or printed on the garment.

After a garment is fully sewn and assembled, it is transferred to the ironing section of the facility for final pressing. Each ironing station consists of an iron and an ironing platform. The irons are similar looking to residential models but have steam supplied by an on-site boiler. Workers control the steam with foot pedals and the steam is delivered via overhead hoses directly to the iron. In most facilities, the ironing platforms are equipped with a ventilation system that draws steam through the ironing table and exhausts it outside the factory.

In the last steps of making a finished product, garments are folded, tagged, sized, and packaged according to customer specifications. Also, garments may be placed in protective plastic bags, either manually or using an automated system, to ensure that the material stays clean and pressed during shipping. Lastly, garments may be placed in cardboard boxes or hung on hangers and shipped to customers.

Accordingly, traditional legacy garment manufacture requires many discrete stages and manual intervention throughout the process. Production of fabrics including, rotary screen printing as well as weaving and knitting of fabrics are manufacturing process steps traditionally performed in facilities specializing in these production methods, more often than not taking place remotely from the facility performing the garment cutting and sewing functions. Generally, after fabric is produced and/or printed, it returns to a completed roll or bolt, which then must be transferred to a different machine for aligning and cutting of the same. The dynamic of the garment manufacturing process is changing with the advent of digital fabric printing which offers an affordable means to produce printed material on-site in the same production facility that cuts and sews the finished product and to produce in smaller batches as needed. However, digital fabric printers are still set up to output rolled imaged fabric and in entire rolls before being manually removed from the printer and physically moved to the spreading or feeding device just ahead of the cutter. The prior known systems also require printing of a partial or complete roll of material in a given pattern without knowledge of, or reliance on, the final shape of the parts to be cut. This naturally leads to wasted material which has been printed in a given pattern in excess of the material needed. A more integrated and efficient manufacturing process is needed to turn a customer's desired garment design into a finished garment via on-demand and automated garment production process using specified amounts of material to be printed, spread, cut, and sewn.

SUMMARY OF THE INVENTION

The system of the present invention (hereinafter referred to as the "Digital Garment System") comprises a virtual development environment configured to receive and store in a database thereof entered body information relating to one or more users, establish measurements for each of the one or more users based on the entered body information, display, on a display device connected to the virtual development environment, a virtual representation of the user using the established measurements, customize one or more garments for each of the one or more users based on the established measurements, display, on the display device, a virtual representation of the one or more customized garments on the virtual representation of the user, receive and store in the database personalization information from each of the one or more users regarding the one or more customized garments, and alter the one or more customized garments and the virtual representation thereof based on the received personalization information.

In a preferred embodiment, the virtual representation of the one or more garments is a personal avatar for a customer. The avatar may be personalized for the customer based upon various factors, including but not limited to gender, height, weight, age, ethnicity, physical dimensions, body mass index, body density, and posture. Using the avatar and a customer's personalized information, the Digital Garment System can create on-demand, customized garments to meet the particular customer's specifications, as well as their personal preferences regarding garments. Preferably, the Digital Garment System can then learn to predict and propose customized garments for a user taking into account both the personalization measurements and their personal preferences.

In another embodiment of the invention, the Digital Garment System facilitates the creation of a multi-sided marketplace where anyone from customers to designers to manufacturers can enter and begin interaction with the marketplace on any chosen level to obtain customized garment production.

BRIEF DESCRIPTION OF THE DRAWINGS

The features and advantages of the invention are apparent from the following description taken in conjunction with the accompanying drawings in which:

FIG. 10 is an illustration of 3-D simulations of garment designs by the Digital Garment System;

DETAILED DESCRIPTION OF THE INVENTION

It will be appreciated that the Digital Garment System in accordance with the invention facilitates production of customized garments for manufacture that meet a customer's specifications. The Digital Garment System can propose and customize a garment for a customer, and then coordinate and monitor every facet of the manufacturing process, including printing, cutting, sewing, finishing, inventory, and product distribution. For avoidance of doubt, the term "printing" shall include 3D printing As used herein, the term "garment" is used in its broadest sense and is intended to include not only apparel but also to include any flexible material. In the art, garment manufacturing often utilizes weaving looms, knitting machines that produce plain and printed fabrics, printers that print patterns, colors, and other marks on fabric that may be used in manufacturing and information tracking. Garment manufacturing also often utilizes cutters that cut based on previously entered information.

Figure 1A:
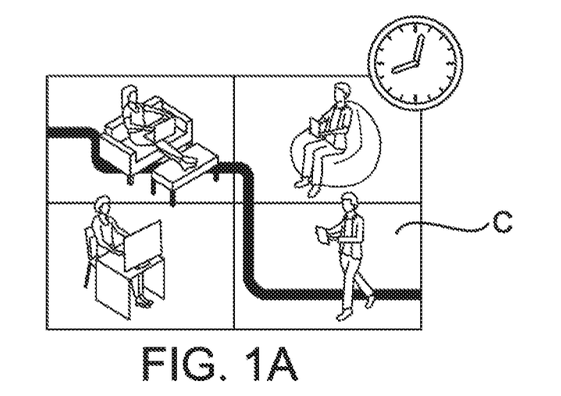
FIG. 1A illustrates a number of customers interacting with the Digital Garment System.

FIG. 1A illustrates a number of customers interacting with the Digital Garment System via a virtual development environment, which may be online or on a local network. Such customers may design their own custom garments, shop existing styles or choose from artificial intelligence ("AI")-driven suggestions, as will be described in further detail below.

Figure 1B:
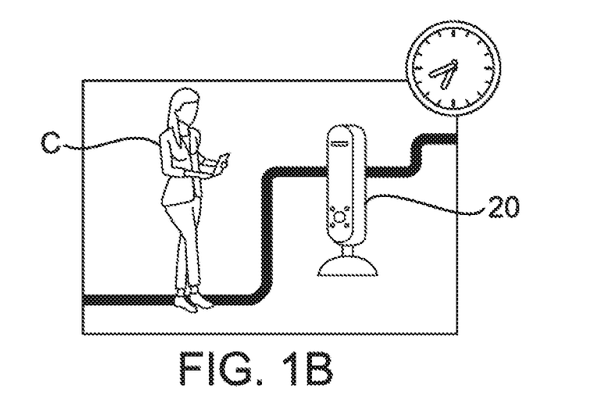
FIG. 1B is an illustration of a customer's body being scanned for use in the Digital Garment System.
Figure 1C:
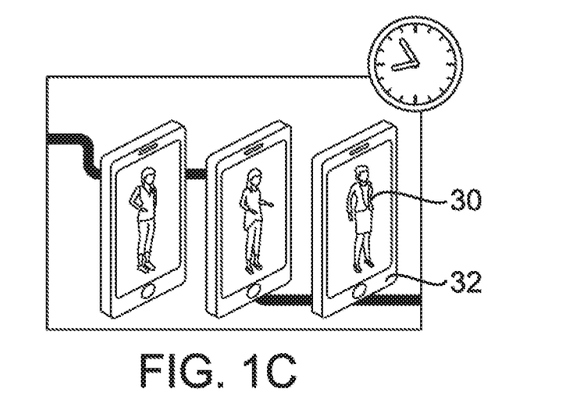
FIG. 1D illustrates submission of a finished garment design to the Digital Garment System.
FIG. 1E is an illustration of a garment manufacturing facility.
FIG. 1F illustrates the combination of customer orders by the Digital Garment System.
FIG. 1G illustrates the printing of fabric by the Digital Garment System.
FIG. 1H illustrates a scan-to-cut operation of the Digital Garment System.
FIG. 1I illustrates the robotic picking and bundling of garment parts by the Digital Garment System.
FIG. 1J illustrates bundles of garment parts transported to robotic sewing machines by the Digital Garment System.
FIG. 1K illustrates delivery of the finished garment to the customer.
FIG. 1L illustrates the receipt of the finished garment by the customer.

In FIG. 1B, a customer's body measurements are entered or scanned, and a personal avatar for the customer is selected and displayed in a display of the Digital Garment System. All entered measurements are stored in a database within the Digital Garment System. The avatar may be personalized for the customer based upon various factors, including but not limited to gender, height, weight, physical dimensions and ethnicity. The avatar may also take into account body density, i.e., body fat versus muscle, or BMI, all of which can effect garment fit. Body density can either be measured electronically or input directly by the customer. Body density is an important consideration in obtaining the proper fit, for example, with elastic garments. The avatar may also be customized to take posture into account. Posture will affect the drape and therefore overall look of a garment. Customers may also provide their own avatar with previously defined body measurements. All such information may be input into the Digital Garment System by a body scanner 20 (as seen in FIG. 1B), by manual input or some other mechanism of electronic transmission, and all information is then stored in a virtual database of the Digital Garment System.

Once exact measurements are established for the customer, the measurements are pushed to the Digital Garment System for pattern generation. The Digital Garment System starts with a base pattern of the desired design from a pattern library that is closest to the customer measurements and then the pattern is adjusted accordingly to meet the exact measurements.

In FIG. 10, the customer is asked whether they would like to see a 3-D simulation of the product on a display 30 of an electronic device 32 having a memory and a processor. If so, the Digital Garment System uses the customer avatar, adjusted to the customer's exact measurements, so that the consumer may virtually "try on" any number of selected products using, by way of example, the Avametric smart phone application to make any final fit or design adjustments. See, https://www.avametric.com/(last viewed Aug. 27, 2019). The Amazon Echo Look may provide the customer with further style guidance. https://www.amazon- .com/dp/B0186JAEWK?taq=googhydr-20&hvadid~230795375717&hvpos-1 ft &hvnetw~q&hvrand"12555892582439046443M (last viewed Aug. 27, 2019).

It will be appreciated that fit is subjective. One customer may prefer their clothing tight as compared to another customer whom may prefer it loose. User preferences can also be stored in a database of the Digital Garment System. Therefore, by reviewing the entered user preferences, AI may be applied so that the system will learn customer fit preferences either based on their answers to particular questions, the garments that they wearing from their closet, or garment returns, As a goal is to minimize returns, if a customer returns a garment because the fit was too tight, even though this fit was what they asked for, the system learns that this customer does not like to wear garments with that tight a fit and thereby improves the fit even though the customer's body measurements haven't changed. In this regard, feedback is obtained from the customer from after receipt of the garment and is fed back to garment design because ultimately the Digital Garment System needs to gauge customer satisfaction with a particular garment produced based either on feedback and/or repeated orders. Customers can provide additional information to adjust their fit preferences, or integrate with other fit management applications via application programming interfaces ("APIs"), as for example TrueFit, to import fit information and preferences.

Advantageously, the Digital Garment System may recognize certain attributes of a customer's avatar that change over time. For example, perhaps the customer's size changes a bit as they get older. Or the customer is not as fit anymore, or perhaps loses weight and becomes more fit. Or the customer's preferences change. The Digital Garment System may automatically update customer information based on feedback from the customer, edits to previous garment orders, new measurements or changes in the customer avatar. For example, the customer wants this shirt that he has always liked and wants to order it again only this time in green. Meanwhile, the Digital Garment System knows the customer's measurements have changed, and he is not quite as slim as he used to be. The Digital Garment System may automatically revise any garment production information so that the customer still gets the great fit that he is looking for without having to change the garment size. It is envisioned that the present invention may operate as a fully automated system, or in an alternate embodiment may be semi-automated with manual input at different points along the way.

Advantageously, the Digital Garment System provides that the customer can put together a finished garment of their choice comprising numerous different garment components, and the finished garment will be simulated in real time with the exact components selected by the customer placed on a dimensionally accurate avatar.

Currently, there are a limited number of available garment sizes, digital prints, sleeves and necklines. The Digital Garment System provides the ability to simulate in real time almost thousands of possible combinations and produce an infinite number of combinations for unique garments.

The Digital Garment System may provide the customer with a more personalized experience because the garment design and selection process is at once more intimate and more tangible. The customer has the ability to use the Digital Garment System to determine how a particular garment may actually look on them, how it would work with their body type, and thereby becomes more relatable as the customer goes through the garment design and selection process.

The Digital Garment System may be operated from a local computer, mobile device, and/or server at a manufacturing or other site, or preferably operated with the use of cloud computing and artificial intelligence ("AI") technology. In yet another embodiment, the Digital Garment System may operate in a hybrid configuration of local and cloud, such as Edge Computing. In such configuration, the Digital Garment System may be stored and operated from a local computer, which synchronizes with central data server or cloud at a predetermined frequency. Artificial intelligence further allows the Digital Garment System to become personal to the customer. By learning, the Digital Garment System improves the customer experience by providing suggestions and help, selecting graphic plans and locating clothing styles that makes them look the way they want to look, and may also learn to automatically print customized garments based on information received from a customer regarding the frequency of obtaining new garments.

The Digital Garment System may not only collect data along the customization and manufacturing process and provide recommendations for particular users, but also apply machine learning or heuristics to optimize the customization and manufacturing process and/or make recommendations to consumers, designers, and manufacturers along the supply chain. For example, the Digital Garment System may determine a preferred cut, fabric, pattern, color, or style for a user. Then, it can make recommendations for future garments for that particular user which meet those qualifications and which match the nature of intended use for the particular garment. The Digital Garment System may also be used to learn and provide information that are not directly utilized in manufacturing. For example, the Digital Garment System may determine from the genealogy of garments that have been previously manufactured what kind of sustainability information is attached to the type of fabric, what causes allergies and other issues, and where and when the garment was created. The Digital Garment System may even suggest new designs and manufacturing options based on certain consumer trends for the manufacturer or recommend certain style for a particular consumer based on her previous orders. Furthermore, the Digital Garment System may suggest particular colors, fits, fabrics, patterns, or stylizes to prevent a mismatch with another garment for production. By way of non-limiting example, the Digital Garment System could recommend that an athletic garment/jersey not be printed on or produced from silk or burlap. Preferably, the Digital Garment System would recognize garments designed for certain purposes and materials most often utilized for certain garments.

It should be noted that the input device for the Digital Garment System of the present invention is not particularly limited, and may utilize voice and/or image recognition. As an example, the Garment System may steer a consumer to a particular design or brand based on images the consumer provides, prior order history or other related metadata pertaining to the specific customer, order history of persons with similar likes and attributers, or to particular items based on ownership of designs provided.

Figure 1D:
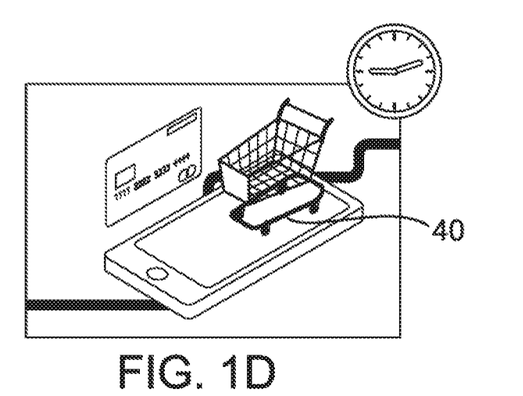

Once a personalized garment is finalized, it is added to the customer's online shopping cart 40, payment is rendered and the order is submitted to the Digital Garment System for processing as shown in FIG. 1D.

Figure 1E:
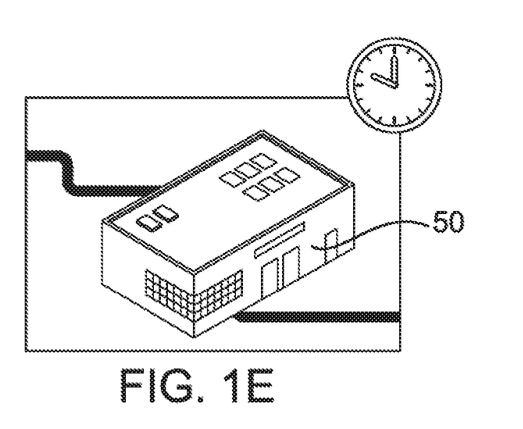

Upon submission, orders from multiple customers may be batched and distributed to garment manufacturing facilities 50, or micro factories, geographically proximate to the customer as illustrated in FIG. 1E.

Figure 1F:
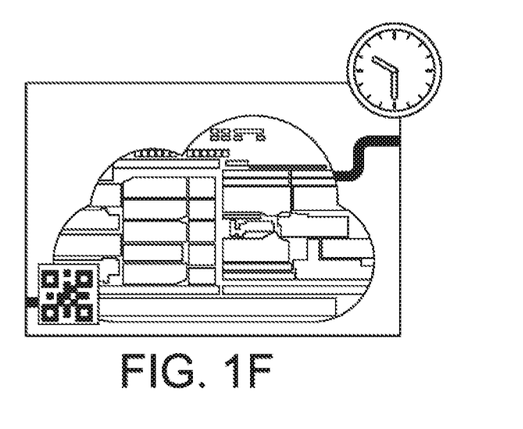

At the garment manufacturing facility 50, customer orders may be combined, generating tech packs and optimized markers using advanced garment manufacturing algorithms as illustrated in FIG. 1F. The garment manufacturing algorithms translate virtual fit into actual fit which is a significant contributor to customer satisfaction and the reduction in returns.

Advantageously, orders from geographically dispersed customers may be aggregated by the Digital Garment System and then distributed for manufacture by an optimized group of manufacturing facilities. Using artificial intelligence, the Digital Garment System may learn the best path for production of garments based upon capacity of each manufacturing facility, its proximity to customers, its proximity to shipping, materials on hand at the facility and any other parameters that will lead to improved efficiency and reduced waste.

Figure 1G:
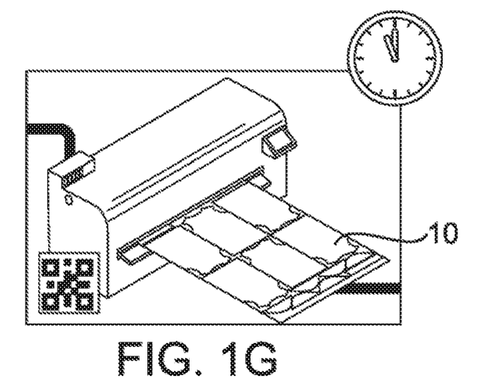
Figure 1H:
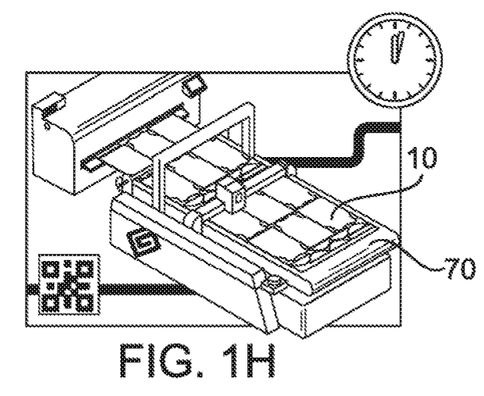

As illustrated in FIG. 1G, digital textile print files, with patented color profile management, are generated with bundle codes on each garment part. The print file is sent to a digital printer 60 that will apply the colors to the garment fabric 10. The garment fabric 10 is then automatically fed into a cutter 70 as illustrated in FIG. 1H where a continuous scan-to-cut operation is completed and garment work-progress information may be captured. Alternatively to digital print and cut, the print file may be output directly to a 3D printer for textiles that will 3D print the garment to the fit specifications provided by the Digital Garment System.

Figure 1I:
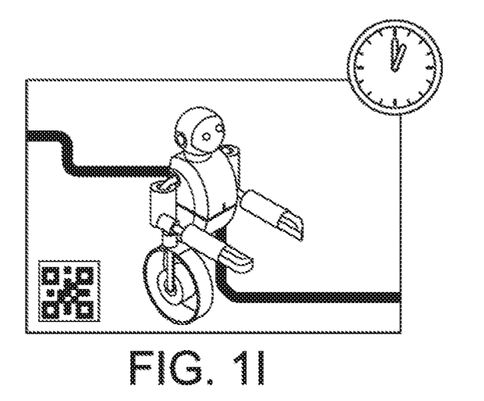

As illustrated in FIG. 1I, the cut garment fabric 10 may be robotically picked, bundled and scanned for tracking. If desired, the customer may be notified of their order status at any intermediate point in the garment production process.

Figure 1J:
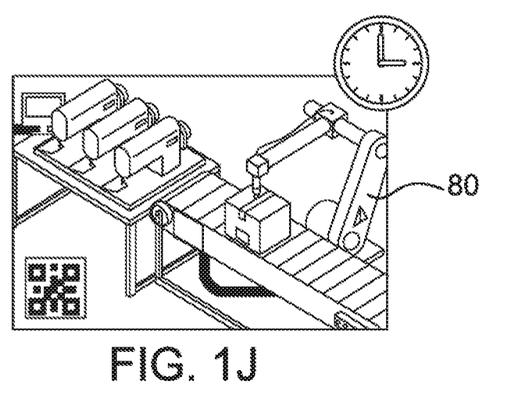

FIG. 1J illustrates bundles of garment parts transported to robotic sewing machines 80 driven by pattern data. After sewing, the finished garments may be automatically packed for delivery or shipment.

Figure 1K:
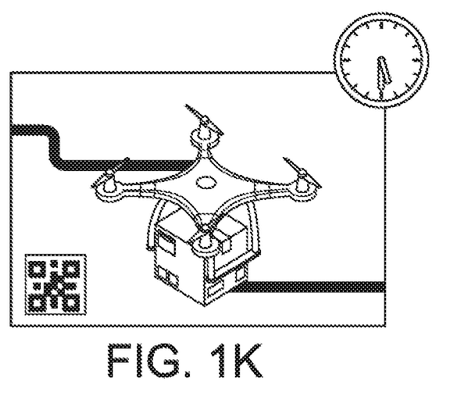
Figure 1L:
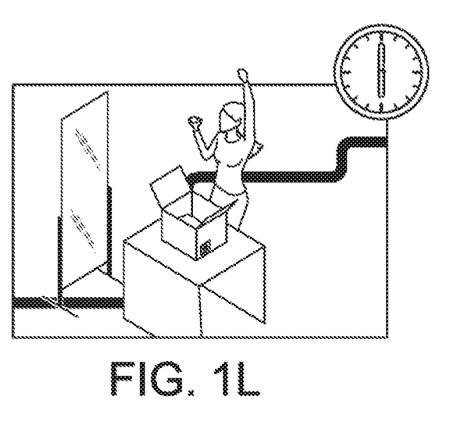

It will be appreciated that the Digital Garment System allows the garment to be produced and delivered to the customer the same day it was ordered as illustrated in FIG. 1K. The customer can then try on the finished garment and compare the garment with their original customer order as illustrated in FIG. 1L. Upon trying on the finished garment, the user can indicate to the system his or her satisfaction with the printed garment and whether he or she intends to return the same, and if so, why. This can then cause the system to automatically recalibrate and update user preferences based on updated personalization information, including whether the user did not like the particular fabric, color, pattern, style, or fit of the garment.

At the garment manufacturing facility, the Digital Garment System may create and maintain a genealogy of the individual garment using garment fibers or anything other indicia suitable for uniquely identifying the garment. This genealogy may include all steps in manufacture of the garment to return or recycling of the garment, including the creation of the fibers and where it is made, who made it, where it was bought, where it was sold, who owns the rights to the design of the garment and fabric pattern, and additional information required for process efficiency, consumer information or sustainability purposes.

This creates a history of the created apparel from a physical as well as digital information perspective. Information may include all the events associated with the product, who made it, how it was made, with what materials, at what time, at what location.

The genealogy is maintained in a database or "ledger" that includes information on all steps in manufacture of the garment to return or recycling of the garment, including the creation of the fibers and where it is made, who made it, where it was bought, where it was sold. A ledger basically is a history, a collection of all the transactions and events throughout the lifecycle of the garment. There is a separate ledger for each garment that's manufactured. In addition, the company may have a macro ledger that includes all of the garments that they have created at that facility.

As the ledger is transactional information stored in a database, the ledger could also use blockchain technologies to capture that information. QR codes, bar codes or RF ID tags could be used on a garment to carry the information. Each of these approaches could be linked to a central storage of that information as it relates to the garment.

It may be appreciated that, at some point in the process, there needs to be some way to reconcile the status of the ledger with the physical garment. This may be accomplished by a tag, a label, or a code on the garment. Additionally, optical technologies may be used to scan the fibers of the garment to detect the identifying information on a micro level using information in the fabric itself. Thus, rather than having a tag on the garment, the Digital Garment System may recognize a "fiber fingerprint" as the garment goes through the manufacturing process. Such technology is available, by way of example, from Applied DNA Sciences of Stony Brook, N.Y. See, http://adnas.com/ (last viewed Aug. 27, 2019), and is discussed in prior U.S. Pat. Nos. 7,310,885 and 7,409,769. Applied DNA's authentication technology provides solutions to tag, test and track raw materials, critical components and finished products.

The genealogy information captured in the ledger may be used for various purposes including garment manufacturing process improvement, design support and customer recommendations. With AI, this information can be mined to determine correlation between the Digital Garment System input parameters and output parameters.

It may be appreciated that certain processes in the garment manufacturing process are destructive to the environment and companies are trying to improve the ecological impact of these processes. The genealogical information in the ledger would provide the ability to establish the genesis of the garment and its effect on the environment.

The genealogical information in the ledger can also be used to establish compliance with applicable laws and regulations by the manufacturing facility in production of the garment. For example, compliance with labor law requirements. Additionally, genealogical information can be used to show sustainability of a garment. That is, how eco-friendly the garment is. For example, the genealogical information may establish that the garment is made with non-polluting dyes, created using minimal waste water, and is a recyclable fabric.

Because the genealogical information provides a fingerprint for the garment, a customer can also quickly determine whether the garment is authentic or merely a knock-off. As such, this is an authenticity assurance that can be provided by the Digital Garment System to the ultimate consumer. The Digital Garment System establishes the garment as authentic by fingerprinting the garment as part of the manufacturing process. At any point after leaving the manufacturing facility, the garment can be checked against its authenticity data to verify that the garment is authentic. A check of the genealogical information may provide the identity of the designer, the brand, and all manufacturing details of the garment.

As previously mentioned, one implementation of the ledger may be using blockchain technology. Blockchain is a technology to track transactions. Blockchain could act as a software ledger that keeps track of transactions in an encrypted way so that all the changes stay attached to the garment. Additionally, blockchain cannot be tampered with and all changes in information related to the garment are securely tracked.

The required infrastructure for a blockchain implementation may developed individually or through an industry consortium. Currently, Amazon Web Services ("AWS") is offering tools and support for building of blockchains. See, https://aws.amazon.com/partners/blockchain/(last viewed Aug. 27, 2019). AWS provides broad and deep capabilities and the largest global infrastructure for building end-to-end blockchain platforms, cost efficiently and at scale. APN Technology and Consulting Partners offer a rapidly growing selection of blockchain and distributed ledger solutions with support for multiple protocols.

It may be appreciated that the concepts described herein are applicable to not only to physical garments but also to garment designs. More specifically, the foregoing discussion of creation of a garment and the process of tracking all the transactions across the workflow can be equally applied to the garment design itself. In particular, the creation of a garment design includes certain design specifications including creative specifications like the color, the look, and the technical specifications of how to make the physical garment. The blockchain implementation as described herein could be associated with a particular garment design and then that garment design could be offered to the broader textile community to reuse and monetize creating further garment designs. As an example, if a designer designs a shirt and it is provided to the textile community, anybody in the world can use that garment design and, since the garment design is linked to a blockchain, the designer may realize some monetary benefit. In this way, a blockchain implementation may be used to track intellectual property across the whole value chain where people become designers not necessarily working for companies anymore but for themselves. Designers can create garment designs, and these garment design specifications could also be manufacturer specifications. Others in the textile community can then use these designs as templates as part of their further creation of physical garments.

The Digital Garment System may include system parameters to control boundaries for physical, visual and brand tolerances relating to a particular garment. Boundaries that match not only the tolerances but also the visual and physical appearances of the garments as well. By way of example, the Burberry plaid may require an exact thread count and color standard for those threads to create the plaid. Tolerances are typically fit to the specific brand. Tolerances for a less-expensive brand may be larger than for a high-end brand.

Such system parameters can follow all the way through the production of a garment, and from a manufacturing perspective, could affect how manufacture of the garment is set up so that quality is maintained. For example, maintaining quality control can cause a lot of sample runs. Samples may be run just for color matching. Another set of samples may be run just for qualification of design and construction. If any of the parameters can be managed in the digital realm rather than the physical realm, sampling time and cost is saved.

Advantageously, the Digital Garment System may also implement a "cut ticket" subsystem for the garments in process at the manufacturing facility. A cut ticket is a textile industry concept and was originally a piece of paper that got passed along from process to process in textile manufacturing. It is typically a garment order. For example, a work order for "x" number of garments would indicate the specific material and amount of material that must be brought to the spreader. The spreader operator would understand that given this cut ticket, "x" number of plies must be spread to satisfy this order. Once the spreader completes this process, the cut ticket is passed to the cutter operator for cutting of the material. The cut ticket system has been digitally automated using a file created by the CAD system in textile planner software.

The ledger of the Digital Garment System is adapted to incorporate the cut ticket as a subsystem of the ledger. As discussed, the ledger tracks all processes and events in the garment lifecycle. Within this information, the cut ticket is basically the recipe for creating the garment. The cut ticket subsystem may feed information to the ledger as to what machine the garment was cut on, when it was cut, the operator, the material supplier, color and batch, etc.

It will be appreciated that a cut ticket could relate to multiple environments, and the cut ticket information could apply to multiple garments on that cut ticket. Further, there exists the opportunity to integrate the cut ticket into a digital print-cut workflow by either housing the print file or directing the printer to the location of the print file. This can be applied to plain fabrics, pre-printed fabrics, and on-demand printed fabrics.

Another important aspect of the invention is to monitor color calibration to ensure accurate color selection for the garment for printing. That is, the metadata for the garment files that are going to the printer must contain the correct information to get the exact color desired printed on the garment.

A simple means may be provided to calibrate computer monitors to insure color fidelity throughout the garment manufacturing process. More specifically, once a customer has chosen a garment color on the computer monitor, a smart phone application may be used to determine the color coordinates (i.e., RGB CMYK values) of the color appearing on the monitor. These color coordinates may then be compared with values for the true color thereby providing an offset to be used in the garment manufacturing process to produce a garment with precisely the color that the customer selected on the monitor. One such color calibration product is Coloro. See, https://int.coloro.com/our-system (last viewed Aug. 27, 2019).

Another way to ensure that the colors are accurate is for the customer to directly specify the RGB CMYK values for the desired color. In yet another way, the color information may be obtained from or provided by another source. It will be appreciated that there are color matching applications for smart phones that can determine the color of an object proximate to the smart phone. Color picker from A&E is one example of a color matching application, http://www.amefird.com/color/colorlink/ (last viewed Aug. 27, 2019).

The customer must have confidence throughout the process that they are picking the right color, and then the Digital Garment System is following that selection through the process to ensure that the proper color is printed. Not only does the end customer have a 3-D image, as discussed above, that would display a garment design with the chosen sleeve, neckline and the like but the chosen color would also be part of the display. Everything about the displayed garment design would look the same as the actual garment when taken out of the box by the customer to wear.

An important feature of the Digital Garment System is automatic image replacement. For example, when manufacturing multiple similar garments, there may be a need to replace a floral print on the garments with a paisley design. The Digital Garment System can instantly accommodate this change by altering the digital file associated with the garment without process interruption.

Similarly, the Digital Garment System can alter the size of a logo on a garment so that the logo dimensions remain proportional to the overall garment dimensions across all of the standard garment sizes. If a logo is to appear on a garment in size small, the dimensions of the logo are automatically proportioned accordingly. In another example, a school sports jersey with a school logo on it, the player's name on the back of the jersey can be automatically changed to produce an individual jersey for each player on the team.

Figure 2:
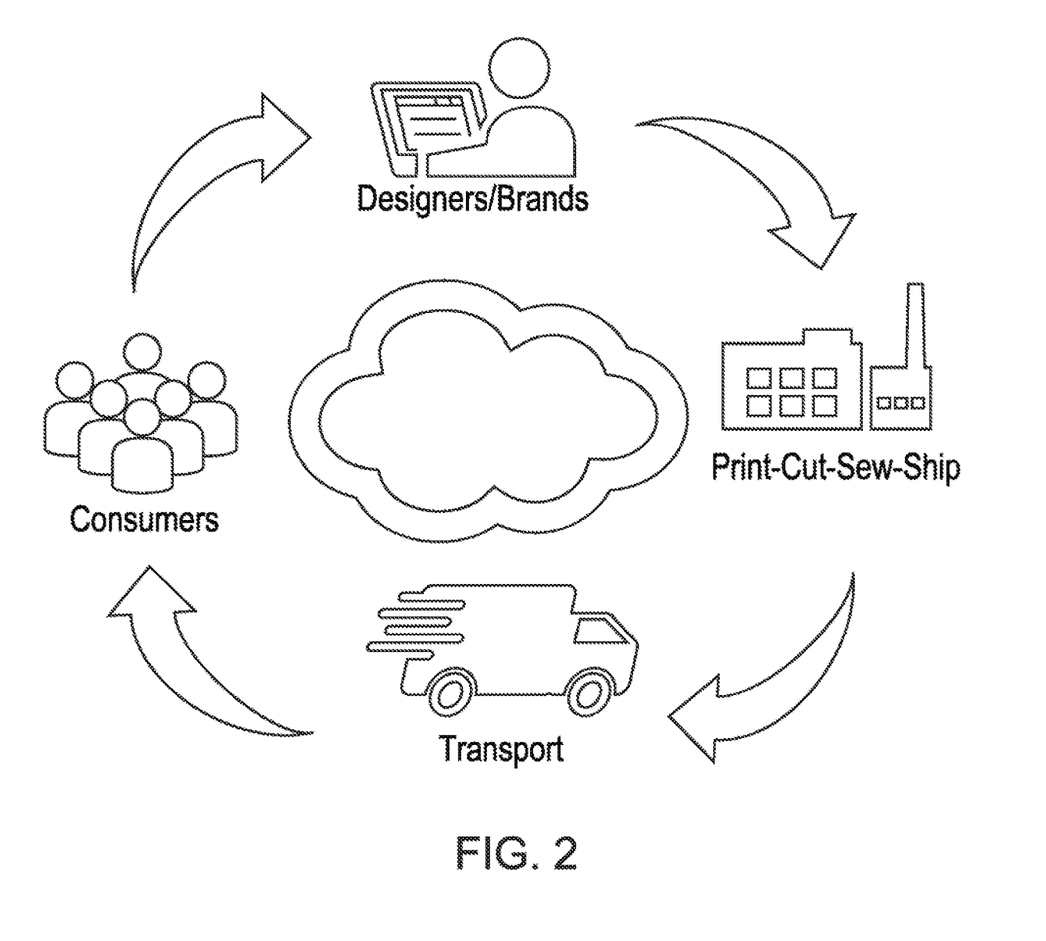
FIG. 2 illustrates a multi-sided marketplace enabled by the Digital Garment System.

It will be appreciated from the foregoing discussion that the Digital Garment System facilitates the creation of a multi-sided marketplace as illustrated in FIG. 2, where anyone can enter and begin interaction with the marketplace on any chosen level. The multi-sided marketplace can connect consumers, designers and brands, manufacturing facilities which print, cut, sew, and ship garments, as well as the transporters of the same, all through an online cloud which can ideally be accessed through a computer or mobile application.

Using a dress as an example, Jane Doe may come into the marketplace and, because she has some background and design experience, she knows exactly what image she wants as her digital print. Additionally, as she has some experience in at least her own garments or in the industry, so she knows exactly what styling details she wants. So she either contributes those garment design details or picks from a menu of what is out there in that marketplace for her contribution to this design. The next person who comes in to the marketplace for a dress might not be as creative as Jane Doe, so they may want this marketplace to provide the suggestions to them of what are the appropriate print designs. What is the appropriate fabric? What would make them look more slim? Accordingly, the marketplace is multi-sided. The participant in the marketplace might be an entire brand, like Burberry, or it might be and individual like Jane Doe, an individual off the street who wants to design and create a one-off garment for herself. And for all of the garment design elements needed, the person or brand can contribute their own original ideas or they can pick from an elaborate menu of ideas that are coming in from others to assemble a finished garment design.

Accordingly, the flexibility of the multi-sided marketplace provides that a participant can come in with a design idea and find a manufacturer to produce the garment or the participant can come in with half ideas and complete them in the marketplace. If a participant is good at manufacturing, they can offer to manufacture for a participant with a good idea. Similarly, if a participant has something that needs to go from A to B, shipping can be offered. Each participant can add value at their own level in the marketplace.

As for payment systems, an e-commerce or blockchain system may be implemented as needed for processing of payments from the end customer and payments to each individual in the marketplace that contributed value and so they get their portion of that payment.

Taken together, the present invention provides an innovative method for collecting and customizing orders, managing data, tracking the production process, and tracing garments through the manufacturing process, all via a fully automated or semi-automated process.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A garment production system, comprising:
a virtual development environment configured to:
receive and store in a database thereof body information relating to a user;
establish measurements for the user based on the body information;
display, on a display device connected to the virtual development environment, a virtual representation of the user using the established measurements;
customize one or more garments for the user based on the established measurements;
display, on the display device, a virtual representation of the one or more customized garments on the virtual representation of the user;
receive and store in the database personalization information relating to the user regarding the one or more customized garments;
alter the one or more customized garments and the virtual representation thereof based on the received personalization information;
scan a fabric fiber of the one or more customized garments using an optical device; and
obtain a fiber fingerprint of the one or more customized garments based on the scan of the fabric fiber of the one or more customized garments.

2. The garment production system according to claim 1, wherein said body information and personalization information is received via one or more of:
scanning;
manual input;
machine learning by the virtual development environment; and
heuristics by the virtual development environment.

3. The garment production system according to claim 2, wherein the virtual development environment is further configured to predict and propose the one or more customized garments for the user based on the machine learning.

4. The garment production system according to claim 1, wherein said body information comprises one or more of gender, height, weight, age, physical dimensions, ethnicity, body mass index, body density, and posture of the user.

5. The garment production system according to claim 1, wherein the virtual representation is configured to update based on learned personalization information by the virtual development environment.

6. The garment production system according to claim 1, wherein said personalization information is updated in the database to reflect received changes to preferences for the user.

7. The garment production system according to claim 6, wherein the virtual development environment is further configured to automatically customize garments for the user based on received changes to the personalization information and/or body information.

8. The garment production system according to claim 1, wherein said personalization information comprises one or more of preferred fit, style, fabric, color, and pattern of the user.

9. The garment production system according to claim 1, wherein said body information is updated in the database to reflect received changes to the body information of the user.

10. The garment production system according to claim 9, wherein the virtual representation is configured to update based on newly received body information.

11. The garment production system according to claim 1, wherein the virtual representation is three-dimensional.

12. The garment production system according to claim 1, wherein the virtual development environment is further configured to initiate manufacture of the one or more customized garments.

13. The garment production system according to claim 12, wherein the virtual development environment is further configured to store in the database received information regarding one or more of:
- satisfaction of the one or more users based on feedback or repeated orders;
- returns of the one or more customized garments for the user;
- genealogy of the one or more fabrics;
- prior order history for the user; and
- order history of additional users with similar likes and attributes.

14. The garment production system according to claim 13, wherein said received information is stored on an online ledger.

15. The garment production system according to claim 13, wherein the virtual development environment is further configured to customize the one or more garments for the user based on the received information regarding satisfaction of the one or more customized garments.

16. The garment production system according to claim 13, wherein the virtual development environment is further configured to combine orders of the one or more customized garments from the user and the additional users to generate tech packs and optimized markers using garment manufacturing algorithms to optimize printing, spreading, cutting, and sewing.

17. The garment production system according to claim 12, wherein the virtual development environment is further configured to initiate manufacture of the one or more customized garments by combining a plurality of the one or more customized garments into a set.

18. The garment production system according to claim 1, wherein the virtual development environment is further configured to identify an amount of material required for the one or more customized garments to be printed and cut.

19. The garment production system according to claim 1, wherein the virtual development environment is further configured to suggest an optimum fit, style, fabric, color, and pattern of the fabric based on an intended use of the one or more customized garments.

20. The garment production system according to claim 1, wherein the virtual development environment is further configured to connect the user with manufacturers and designers in an online marketplace.

* * * * *